United States Patent Office 3,637,558
Patented Jan. 25, 1972

3,637,558
ELASTOMERIC COMPOSITIONS FROM ASPHALT AND PARTIALLY UNCURED URETHANES OF ALLYLIC, HYDROXYL-TERMINATED DIENE POLYMERS
Joseph A. Verdol, Dolton, and Patrick W. Ryan, Chicago Heights, Ill., assignors to Atlantic Richfield Company
No Drawing. Continuation of application Ser. No. 536,301, Mar. 22, 1966, now abandoned, which is a continuation-in-part of application Ser. No. 465,161, June 18, 1965. This application Jan. 23, 1969, Ser. No. 797,347
Int. Cl. C08f 45/52
U.S. Cl. 260—28.5                                18 Claims

ABSTRACT OF THE DISCLOSURE

Compositions containing asphalt and urethane which is the reaction product of a diisocyanate with an intermediate polyhydroxy polymer having an average of at least about 1.8 predominantly primary, terminal, allylic hydroxyl groups per molecule and being an addition polymer of 0–75% by weight of an alpha-olefinic monomer of 2 to 12 carbon atoms, and about 25 to 100% of a 1,3-diene hydrocarbon of 4 to about 12 carbon atoms, the intermediate polyhydroxy polymer having a viscosity at 30° C. of about 5–20,000 poises and a number average molecular weight of about 400–25,000. The urethane component is at least partially uncured when combined with the asphalt. These rubberized asphalt compositions are easily worked and can be used alone for patching, crack-filling and weatherproof coatings, or can be mixed with other materials, such as granular, inorganic, often siliceous materials and with conventional paving aggregates to make paving compositions. The material sets up to an elastomeric composition after the paving composition is applied to the road surface. These compositions possess improved low temperature flexibility, improved adhesion, high abrasion resistance, decreased tack and little tendency to bleed at elevated temperatures.

---

This application is a continuation of application Ser. No. 536,301, filed Mar. 22, 1966, now abandoned, which is a continuation-in-part of co-pending application Ser. No. 465,161, filed June 18, 1965.

The present invention is concerned with compositions containing asphalt and particular urethane resins. The urethane resins are derived from the reaction of a polyisocyanate with a polydiene resin having terminal, allylic hydroxyl groups. The rubberized asphalt may be used alone in certain coating and crack-filling applications or may be mixed with other materials, e.g. a granular, inorganic, often siliceous, material. For paving large areas, the rubberized asphalt may be used as a binder for suitable conventional paving aggregate. For patching, crack-filling, weatherproof coatings, etc., the rubberized asphalt may be used alone or mixed with finer siliceous material. The binder-aggregate mixtures are applied as paving compositions, in the conventional manner, to afford final paving materials which display elastomeric properties. The compositions of this invention possess improved low temperature flexibility, improved adhesion, high abrasion resistance, decreased tack and little tendency to bleed at elevated temperatures.

The blending of rubber into asphalt to impart rubberized properties to a paving composition is well known in the art. Conventional general purpose rubbers such as styrene-butadiene rubber, natural rubber, cis-polybutadiene rubber, butyl rubber, ethylene-propylene copolymers, ethylene-propylene terpolymer rubbers and other conventional general purpose solid rubbers have been proposed for blending into asphaltic compositions; however, the solid physical state of conventional rubber prior to blending presents a number of problems which the art has not satisfactorily solved. If the rubber is in a highly cured state (a state in which it possesses its maximum physical properties) it is difficult or impossible to obtain a homogeneous solution of the rubber and asphalt. Generally, solid rubber is pelletized, pulverized or emulsified into latex form (while in a partially cured or uncured state), and subsequently blended into the asphalt at elevated temperatures. Even under these conditions, complete compatibility of the rubber and asphalt is difficult to achieve and usually requires prolonged mixing and milling at elevated temperatures to achieve optimum solubility and maximum physical properties of the final blend.

Furthermore, when natural rubber and other conventional hydrocarbon-type rubbers are mixed into asphalt, the resulting compositions are tacky, stringy and very difficult to work. Moreover, when the finished paving composition is being applied to the road surface, the extremely viscous nature of the material greatly increases the time and labor involved.

In accordance with the present invention it has been found that improved rubberized asphalt compositions can be prepared by blending asphalt with defined urethanes in an at least partially uncured state, or urethane-forming materials. The composition may also contain other ingredients, e.g. solid, inorganic materials such as finely divided siliceous solids or aggregate to make a paving composition. The finished paving composition thus prepared shows improved physical strength, and possesses elastomeric properties in comparison with the unmodified asphalt. For example, the product may display little tack, but has improved flexibility at low temperatures, better self-healing properties, and improved adhesion to the aggregate and paving substrate. Moreover, there is little tendency for the composition to bleed at elevated temperatures, e.g., during summertime exposure when the paving often exceeds temperatures of 100° F.

Also, the mixtures of the present composition are fluid in nature at working temperatures and do not display the undesirable characteristics of solid rubber-asphalt blends or asphalt-latex rubber blends. The material is easily worked and sets up to an elastomeric composition after several hours or days after the paving composition containing the urethane-asphalt blend is applied to the road surface. Thus, the rubberized asphaltic compositions can be prepared without the use of special blending or milling equipment. For example, in accordance with the present invention a mixture of hydroxyl-terminated polydiene polymer plus a diisocyanate reactant (such as tolylene diisocyanate) may be admixed and added to the asphalt in liquid form using conventionally employed heating tanks. The resulting mixture may then be added to the pug mill containing the aggregate.

A further use of the compositions of the present invention is as sealers for preventing erosion during weathering of roads, driveways and the like. The highly rubberized nature of the asphalt-hydroxyl-terminated polybutadiene urethane compositions of the present invention make them excellent for sealing small fissures, cracks and defects which occur during normal winter erosion and heavy traffic conditions. Such sealing compositions are usually comprised of hydroxyl-terminated polydiene-diisocyanates and asphalt without aggregate, or with finely dispersed fillers such as low-cost silicas and other minerals. Other solid fillers such as carbon blacks and low-cost metal oxides may also be employed. Pigments may be added to the mixture to impart specific colors to the sealing compositions.

The urethane resin which forms part of the composition of this invention is derived by isocyanate reaction with a polydiene intermediate polymer having a particular structure and containing allylic hydroxyl groups. The ability of this intermediate polymer to react with the isocyanate reagent at normal asphalt paving temperatures, say in the range of about 120–200° F., appears to be largely attributable to this more reactive allylic configuration. The hydroxyl groups are generally at the ends of the main, that is, the longest, hydrocarbon chain of these usually liquid diene polymers. These polymers differ from the homopolymers and copolymers of butadiene and related dienes which are commercially available as GR–S rubber, etc. The intermediate polymer may often have a viscosity at 30° C. of about 5–20,000 poises, preferably about 15 to 5000 poises. Usually the intermediate polymer, when a homopolymer, is obtained in a viscosity range of about 20 to 300 or 500 poises at 30° C. Preferred homopolymers have a viscosity of about 36 to 60 poises or about 190 to 260 poises. Thus, the diene polymers are liquids or semi-solids flowable at least with the application of moderate pressure at ambient temperatures or at elevated temperatures up to about 400° F. The allylic hydroxyl-terminated intermediate polymers used in the present invention will usually have molecular weights in the range of about 400 to about 25,000 as determined by cryoscopic, ebullioscopic or osmometric methods. The preferred hydroxyl-containing diene homopolymers and copolymers will be in the molecular weight range of about 900 to 10,000. In contrast, conventional diene polymers such as GR–S rubber are extremely high in molecular weight, e.g., in the range of several hundred thousand and are, therefore, rubber-like materials which if used instead of the polydiene urethane will not give the paving compositions of this invention.

The hydroxy-terminated diene intermediate polymers used to make the novel composition of this invention differ from conventional diene polymers known to be telechelic and/or hydroxy-containing in that the majority of unsaturation is in the main hydrocarbon chain and in that the hydroxy components are in predominantly terminal positions on the main hydrocarbon chain and are predominantly primary and allylic in configuration. Ordinarily, at least about 1.8 predominantly primary, terminal, allylic hydroxyl groups are present per molecule on the average. It is quite preferred, however, that the predominantly primary terminal hydroxyl groups average at least 2.1 hydroxyls per intermediate polymer molecule, and, as mentioned, are for the most part allylic in structure, thereby being of a more reactive nature in the condensation reaction and apparently providing an improved stability in the final product. The diene partial polymer has the majority of its unsaturation in the main hydrocarbon chain and this appears to provide polymers of improved elasticity characteristics.

The dienes which are employed to make the intermediate polymers are unsubstituted, 2-substituted or 2,3-disubstituted 1,3-dienes of 4 up to about 12 carbon atoms. The diene preferably has up to 6 carbon atoms and the substitutent in the 2- and/or 3-position may be hydrogen, alkyl, generally lower alkyl, e.g. of 1–4 carbon atoms, aryl (substituted or unsubstituted), halogen, nitro, nitrile, etc. Typical dienes which may be employed are 1,3-butadiene, isoprene, chloroprene, 2-cyano-1,3-butadiene, 2,3-dimethyl-1,3-butadiene, 2-phenyl-1,3-butadiene, 2-methyl-3-phenyl-1,3-butadiene, etc.

The usable intermediate polymers will generally conform to the following simplified chemical structure

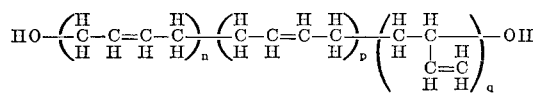

in which $n$ plus $p$ is greater than $q$, that is, the in-chain unsaturation accounts for more than 50% of the unsaturation. One or more of the hydrogens appearing in the above formula may be replaced by hydroxyl in some of the molecules. This formula should not be understood as implying that the polymers are necessarily in blocks, but the cis-1,4-, trans-1,4- and vinyl (1,2) unsaturation are usually distributed throughout the polymer molecule. Generally $n$ will be a number sufficient to give a cis-1,4-unsaturation content of about 10–30 percent; $p$ will be a number sufficient to give a trans-1,4-unsaturation content to the polymer in the range of about 40–70 percent while $q$ will be sufficient to give a pendant 1,2-vinyl unsaturation of about 10–35 percent. Often the polymer will contain largely trans-1,4-units, e.g., 50–65 percent and 15–25 percent cis-1,4-units, with 15–25 percent 1,2-units. Branching may also occur in the above polymers, especially those prepared at higher temperatures.

Although intermediate polymers of the above described type, averaging more than one predominantly primary hydroxyl per molecule, say about 1.8 to 3 or more per molecule, may sometimes be employed in this invention, they preferably have an average of about 2.1 to 2.8 hydroxyl groups per molecule, and the hydroxyl groups are predominantly in terminal allylic positions on the main, generally longest, hydrocarbon chain of the molecule. By "allylic" configuration is meant the alpha-allylic grouping of allylic alcohol, that is, the hydroxyls of the intermediate polymer or the hydroxyl residues of the finished elastomer are attached to a carbon adjacent to a double-bond carbon. Preferably the polymer molecule is substantially free of other hydroxyl groups or other indiscriminately distributed groups reactive with isocyanate in order to avoid indiscriminate, premature or excessive cross-linking.

The ratio of cis-1,4 and trans-1,4 and 1,2-vinyl unsaturation which occurs in the diene polymers used in the present invention, the number and location of the hydroxyl groups and the molecular weight of the intermediate polymers can be a function of polymerization temperature and the type of addition polymerization system employed in forming the first intermediate polymer. It has been found that diene polymers of the desired configuration may be obtained using hydrogen peroxide as the catalyst for polymerization in an alcoholic medium. The $H_2O_2$-alcohol system appears to supply both the hydroxyl groups and the catalytic and solvent effects needed to produce the intermediate diene polymers of desired chemical and physical characteristics. In such an homogeneous polymerization system, the alcohol serves as a solvent for the peroxide and as a solvent or diluent for the diene monomer and is used in an amount suitable to promote adequately rapid but controllable polymerization of the monomer material in the solution to form the diene polymers. The polymerization usually takes place in solution at temperatures in the range of about 30° C. to 150° C. Usable alcohols will generally be those of 2–12 carbon atoms which are free of any group which would interfere with the production of the desired diene polymer. Saturated alcohols are preferred and often those having about the same carbon atom content as the diene monomer will be found most useful. Thus propanol or isopropanol is often used in butadiene polymerization. The $H_2O_2$-alcohol system may also contain ketones, ethers, alcohol-ketones, alcohol-ethers and alcohol-esters which are miscible in water in all proportions and which do not contain polymerizable carbon-to-carbon unsaturation or otherwise interfere with polymerization or enter into the product. The peroxide material is often used in amounts of about 1% to 15% of the reaction mixture to assure a low molecular weight addition polymer product having an average of greater than two hydroxyl groups per molecule.

Vinylidene monomers may be incorporated into the diene intermediate polymer products used in this invention. Usable monomers are alpha-olefins of about 2 or 3 to 10 or 12 carbon atoms such as styrene, vinyl toluene, methyl methacrylate, methyl acrylate, acrylic esters, vinyl chloride, vinylidene chloride, etc. Acrylonitrile, acrylic acid, vinylidene cyanide, acrylamide, etc., provide low-molecular weight hydroxy-terminated diene intermediate copolymers which are suitable for the isocyanate reaction. As can be seen, the useable vinylidene monomers generally are ethylenes, substituted with halogen, aromatic hydrocarbon, or even cyano or carboxyl-containing radicals in some instances. The choice and amount of vinylidene monomer employed will often be determined on the basis of properties desired in the final elastomer resin. Generally the amount of vinyl polymer will be about 0–75% by weight of the total intermediate polymer, preferably up to about 40%, say about 10–40%.

In addition to the homopolymers and copolymers comprised of single dienes and single vinyl monomers, the present invention may also use intermediate polymers made from combinations of a plurality of dienes and vinyl monomers, which are predominantly allylic hydroxy-terminated. For example, mixtures of butadiene, isoprene and styrene can be polymerized to afford low molecular weight hydroxyl-containing interpolymers. Also, the polymer materials used in this invention may be given improved oxidation and ozone resistance by hydrogenating the hydroxyl-containing diene polymers to their corresponding more-saturated derivatives. Usually, the hydroxyl-containing diene polymers of the present invention will at most be only partially hydrogenated, so as to provide a material which is more stable due to diminished unsaturation, but which still has good elastomer properties.

The isocyanate material used to produce the urethane resin in the composition of this invention may be any one of a number of materials containing two or more isocyanate radicals. The useable agents for making the urethane polymers of this invention include the aliphatic, including cycloaliphatic, and aromatic diisocyanates such as one or more of tolylene diisocyanate (TDI), 4,4'-diphenylmethane diisocyanate, 1,5-naphthalene diisocyanate, phenylene diisocyanates, trans-vinylene diisocyanate, hexamethylene diisocyanate, octamethylene diisocyanate, 3,3'-dimethoxy-4,4'-biphenyl diisocyanate, as well as related aromatic and aliphatic isocyanates, which may also be substituted with other organic or inorganic groups that do not adversely affect the course of the urethane-forming reaction. These diisocyanates can be reacted with the diene intermediate polymers at ambient temperatures to form urethane linkages, apparently due to the increased reactivity given the hydroxyl groups by the allylic configuration. For example, when a low molecular weight hydroxyl-containing polybutadiene is reacted with a diisocyanate, such as 2,4-tolylene diisocyanate, a polyolefin-polyurethane elastomer of the simplified following structure may result:

tion polymerization. It also will be observed that the chain-extended polymer provides amino nitrogen having replaceable hydrogen which can be exploited in the cross-linking.

In addition to the simple diisocyanates described above, the hydroxy-containing diene polymers can be condensed with isocyanate polymers, such as polyarylene polyisocyanate (PAPI) and/or with isocyanate-terminated polyhydroxy materials, e.g. polyesters, etc., which are generally produced by reacting the isocyanate with, for example, polyglycols (such as polypropylene glycol) and polyesters (for instance of glycols, including polyglycols and polycarboxylic acids, such as polyethylene adipate). These materials may be reacted with an excess of a diisocyanate. An example of such a material is the product obtained by the reaction of one mole of propylene glycol with 2 moles of 2,4-tolylene diisocyanate as shown below:

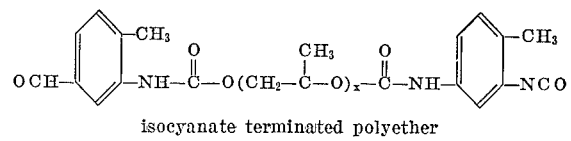

isocyanate terminated polyether

As mentioned, polyisocyanates such as the materials sold commercially as PAPI (polyphenylmethane polyisocyanate) of the following structure:

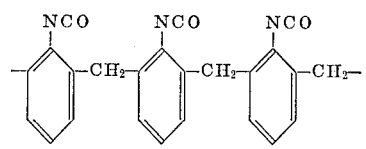

can also be employed. Other isocyanate reactants which can be utilized in manufacture of the products of the present invention are isocyanate terminated pre-polymers prepared by the reaction of tolylene diisocyanates or other isocyanates with hydroxyl or amine-terminated polyesters, polyethers or polyamides.

Rather than combine the polyisocyanate with only the allyl-hydroxyl diene polymer, other polyfunctional reactants having at least two active hydrogens can be included with, before or subsequent to combination of the polyisocyanate and allyl-hydroxyl diene polymer. In other words the order of addition can be in any manner desired. Such other polyfunctional reactants may be up to about 90%

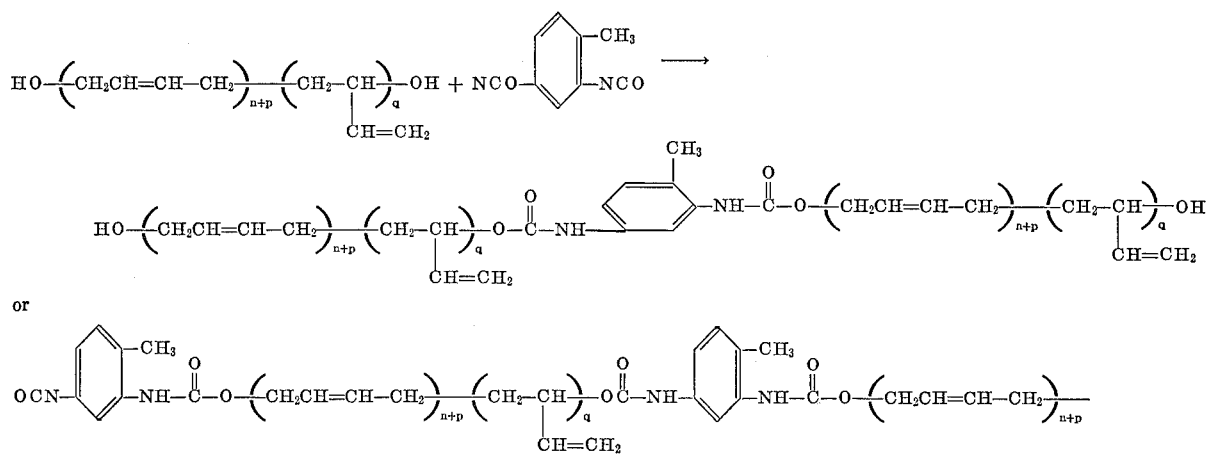

As shown above, the resulting high molecular weight polydienepolyurethane elastomer may be either hydroxyl-terminated, isocyanate-terminated, or both, depending upon reaction conditions or the ratio of diisocyanate to hydroxyl-containing polydiene employed in the condensaor more weight percent based on the total of its weight and that of the allyl-hydroxyl diene polymer, and when such other polyfunctional material is present it often is at least about 5 weight percent, preferably about 5 to 50 weight percent.

Thus mixed urethane polymers may be made by incorporating other hydroxyl materials with the diene intermediate polymer and linking the hydroxyls together with diisocyanates. Such polyhydroxy materials as glycols, including polyglycols, polyesters and further amounts of hydroxyl-terminated polydiene, to give additional urethane linkages in the finished polymer, may be used. For example, a hydroxyl-containing intermediate polydiene may be mixed with polyhydroxy materials such as polypropylene glycol, polyethylene glycol, interpolymers of polyethylene and polypropylene oxides, and hydroxy-terminated polyesters, e.g. of polyols and polycarboxylic acids, which are normally employed to make conventional urethane rubber. Examples of such materials are polyoxypropylene glycols known commercially as Pluracols, Carbowax, etc. Polyfunctional polyols such as trimethylol propane, pentaerythritol, glycerol, etc., or propylene and ethylene oxide adducts of these materials may likewise be employed in the urethane system comprised of hydroxyl-terminated diene polymers. In such cases polymers are formed which have polydiene moieties linked through chain-extension and/or cross-linking at the hydroxy residues to glycol, polyolefins, polyether or polyester moieties.

The isocyanate materials are often used in an amount sufficient to supply about 0.1 to 10 NCO groups per total active hydrogens of the diene intermediate polymer and any other active hydrogen-polyfunctional material used. Often this ratio is about 0.8 to 1.5. When monomeric tolylene diisocyanates are used, it is advantageous to employ about 4–10%, preferably about 5–8%, diisocyanate by weight of the allyl hydroxy-terminated diene polymer, especially when no other active hydrogen material is present of markedly different molecular weight.

When diamines are included in the reaction mixture, urea-urethane polymers are formed. A wide variety of aromatic and aliphatic diamines may be employed as the reaction component to make asphalt compositions rubberized with urea-urethane resin. These diamines may often be used in an amount sufficient to provide one amino group for each 0.1 to 9 hydroxyl groups, that is, in the total of amino and hydroxyl groups, the amino groups may represent about 10–90% of the total and hydroxyl groups may represent about 90–10% of the total. Generally, the amino material may be from less than about 1 to 90% of the total of amino and hydroxyl material, but of course, enough of the diene intermediate polymer residue will be present to give the desired physical properties.

Typical amines of up to 40 or more carbon atoms which may be employed are aromatic diamines (both substituted and unsubstituted) such as 4,4'-methylene bis (2-chloroaniline) (MOCA), 3,3'-dichlorobenzidine (DCB), N,N'-disecondarybutyl p-phenylene diamine, N,N'-dibenzylethylene diamine, methane diamine, ethylene diamine, ethanolamines, hydroxylamine, p,p'-diphenylamine, p-phenylene diamine, hexamethylene diamine, diethylene triamine, tetraethylene pentamine, lauroguanamine, and amine-terminated products obtained from the reaction of dibasic acids with diamines; e.g., the reaction products of dimerized unsaturated fatty acids with diamines. Diamides of similar carbon atom range can also be employed as chain extending agents; e.g., materials made by the reaction of dibasic acids, acid chlorides or anhydrides with ammonia. Other products which are useful are the reaction products of polyethers (e.g., poly(oxypropylene) glycol and polytetramethylene glycol) and ethylene imine; reaction products of hydroxyl-terminated polyesters with ethylene imine are also useful as amine reactants for preparing urea-urethanes for use in the present invention. It is particularly noteworthy, that many highly reactive amines, (e.g., amines which are ordinarily too reactive for use in urea-urethane elastomer systems derived from polyethers or hydroxyl-terminated polyesters) can be employed in the production of urea-urethane elastomers for the present invention because the presence of asphalt increases the pot-life of the system.

In a preferred form of the invention the urethane resin can be formed completely in the presence of the asphalt, for instance by mixing the asphalt with the diisocyanate and diene polymer and subsequently the latter two ingredients react to provide the urethane. This procedure can also be followed when other active hydrogen-polyfunctional materials, e.g. glycols or diamines, are employed as well as the diene polymer. The various reactants can be combined with the asphalt in any order desired. Two-step procedures may also be employed in forming the novel compositions of this invention. Regardless of the sequence of adding or combining the hydroxy-terminated diene polymer and other reactants, the mixture contains, at least upon initial mixing, the urethane component in an unreacted, uncured or partially cured state, i.e. is at least partially uncured, within the asphalt system. Thus, the urethane component must not be completely cured before admixture with the asphalt. This lack of cure when mixing must be sufficient to provide compatible materials and the presence of either unreacted isocyanate or unreacted hydroxyl groups is indicative of the uncured "urethane" state. Although it is preferred that the mixture of urethane and asphalt becomes eventually more or less completely cured this may not be necessary in some instances, especially when the hydroxy component is in sufficient excess. Regardless of the procedure followed in mixing these materials the asphalt is or is made sufficiently fluid to provide good mixing, and often somewhat elevated temperatures are required.

As an example of a two-step procedure, it may be preferred to employ isocyanate-terminated diene prepolymers, for admixture with asphalt, and if desired, a suitable other difunctional material reactive with isocyanate. In such compositions the terminal isocyanate residues of different polydiene molecules are joined by means of suitable difunctional compounds such as glycols, diamines, a combination of both, or even, in some cases, water. These prepolymers are prepared using an excess of isocyanate to react with the hydroxy-terminated diene polymer. Usually at least about two moles diisocyanate will be provided for each mole of diene polymer and other polyfunctional material, and those prepolymers having more than 3%, preferably 6–9% free–NCO (as determined by dibutyamine titration) are found to have the best storage stability. These prepolymers generally have toxicity characteristics much lower than diisocyanate monomers. Amine-terminated polydiene homopolymers and copolymers which have been made by the reaction of the allylic hydroxyl-terminated polydiene homopolymers and copolymers with ethylene imine or other diamines described above are also suitable as co-reactants with diisocyanates in the production of asphalt urea-urethane compositions of the present invention.

When hydroxyl-terminated polyesters or polyethers are employed in conjunction with the hydroxyl-containing diene polymers, these polyesters or polyethers may be converted to isocyanate-terminated prepolymers, which in turn may be utilized in conjunction with the hydroxyl-terminated diene polymers to form urethane elastomer-asphalt systems. Commercial materials of this type may be urethane prepolymers based on poly-(1,4-oxybutylene) glycols) and known as Adiprene L. Other commercial materials are isocyanate-terminated poly(oxypropylene-glycols) or polyoxyethylene-glycols and isocyanate-terminated polyesters. The latter are known as Multrathanes. Typical reactions and reagents for cross-linkable polymer production are illustrated below:

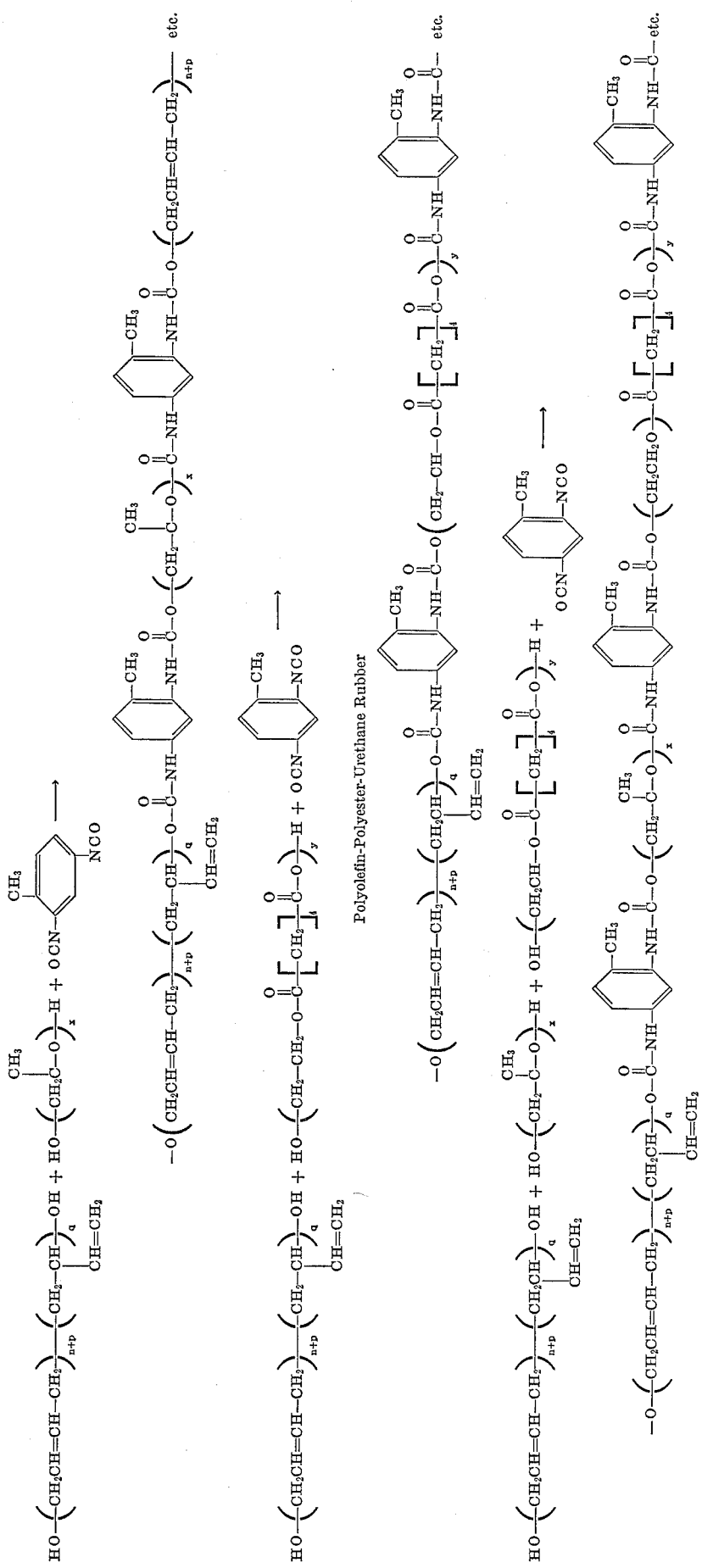

Polyolefin-Polyester-Urethane Rubber

The cross-linking of proximate chains of the polymer may be brought about through the polydiene residues, the chain-extending agent residues, or both. The use of the preferred polydiene materials having more than 2.1 hydroxyls per molecule, allows cross-linking by means of urethane linkages when a suitable amount of diisocyanate is employed in the reaction. Also, cross-linking may, and usually does, occur between the urethane moieties themselves of adjacent polymer molecules. In addition, gamma radiation, common vulcanization agents, etc., may be employed to bring about cross-linking at the double bonds of polydiene residues in adjacent polymer molecules. Sulfur, used as sulfur, thiuram derivatives and other materials conventionally employed to vulcanize natural rubber, GRS rubber and related synthetic polyolefin rubbers, may thus be added to promote cross-linking. Generally, amounts of vulcanizing agents common to the art can be employed for instance, about 1–50 parts, preferably about 1–10 parts by weight per part of polymer, as well as conventional vulcanization temperatures. The tailor-making of block urethane polymers composed of varying amounts of diene blocks and diene-vinyl blocks, as well as polyether and/or polyester blocks, enables one to randomly blend or co-react conventional polyether-polyurethane and polyester-polyurethane elastomers with the polymers and the asphalt. Furthermore, the diene-urethane polymers or other chain-extended polymers (including the diene-polyether-polyester-urethane block polymers) may be blended for co-vulcanization in the asphalt blend with conventional diene rubbers such as natural polyisoprene, GR-S rubber, GR-N rubber, Neoprene rubber, etc. Thioplast materials containing a plurality of sulfur linkages can also be coblended and co-cured in a similar fashion. It should be pointed out that the finished elastomer still usually contains an abundance of olefinic unsaturation.

The conditions for urethane polymerization may vary, depending in part upon the conditions of use of the resulting product. With the prefered agents, that is, arylene diisocyanates such as tolylene 2,4- and 2,6-diisocyanates, the reaction may be carried out at lower temperatures to give a workable "chain-extended" polymer which may, if desired, subsequently be cross-linked by curing at a higher temperature or by working. Thus the allylic hydroxyl-terminated diene polymer may be allowed to react with the diisocyanate at a temperature of about 25–150° C. This chain-extended polymer, just after making, is still workable and may be blended with asphalt at a higher temperature of asphalt working, often as high as about 175° C. or higher. Subsequent quiescence allows cross-links to form, producing a firm product. It is preferred, however, to mix the hot asphalt, diene intermediate polymer and diisocyanate reagent together, engendering chain-extension and cross-linking simultaneously at the higher temperatures.

The polymerization usually can be conducted without the use of catalysts. However, when acceleration of the cure time is desired, catalysts such as dibutyl tin dilaurate, stannous octoate, diazobicyclooctane (DABCO), diethylene triamine, cobalt naphthenate, etc., may be used. Many other organo-metallic and amine catalysts, such as those ordinarily employed in the production of conventional urethane elastomers, coatings, sealants, caulks, foams, etc. can be used to catalyze polymerization in the present invention. When used, the catalyst will often appear as about 0.1 to 0.5, preferably about 0.2 to 0.4, parts per 100 parts of diene polymer. Since the isocyanate moiety is sensitive to water, the isocyanate reactant should be essentially isolated from water, air, etc., before the reaction. Also, the polydiene and other reactants should be degassed in vacuo, when needed, to remove moisture before the reaction.

The urethanes employed in this invention are miscible with asphalt in all proportions and the exact amounts of each to be found in the finished composition will depend on the use intended. Thus the composition may contain as little asphalt or as little uretane resin as is found to give a significant effect, say as little as 1% of either material in certain circumstances. The asphalt may comprise the major ingredient of the blend, and, because of cost considerations it may be preferably to use larger proportions of asphalt than the urethane resin. Preferably about 3 to 30 percent of the urethane resin is employed in the binder compositions, or if a product is desired in which greater urethane properties are needed the asphalt may be in a proportion such that the urethane content is about 40 to 85% of the total composition.

The asphalt employed may be a mineral oil crude residue, e.g. of the type usually employed in a paving composition, and often having a penetration of up to about 400, preferably about 20–300 [ASTM-D 5–52 (77° F., 100 gms., 5 secs.)]. Although asphalt is preferred for use with the urethane resin in compositions according to this invention, it is possible to substitute a variety of usually light-colored resins for this purpose. These materials are higher in cost than asphalt but are frequently desired to achieve materials resembling concrete in color or to achieve paving compositions which can be pigmented to any desired color. Some of the light colored resins which may be employed in conjunction with the present invention are xylene-formaldehyde resins, coumarone-indene resins, low molecular weight polyalpha methylstyrene resins and other hydrocarbon resins such as coal tar pitch. Asphaltenes, chlorinated biphenyl ethers, chlorinated waxes, rosin esters, certain esters and amides of styrene-maleic anhydride resins, polybutenes, as well as many other materials may be used, either alone, or in conjunction with each other.

The aggregates which may be used in paving compositions according to this invention are inert inorganic solids of numerous conventional types, see U.S. Pats. Nos. 3,136,732 and 3,179,610. For thin sections or surface layers, a fine aggregate may be used, such as a sand having a grading of about ¼" down to 100 mesh. Some powdered filler may be used, such as ground limestone, pulverized sand, silicas, clays, etc. On the other hand, for coarser sections, slabs or bulk articles, for example, from ½" to 5 feet or more in thickness, with or without an overlying finer surface coating, large crushed aggregates may be used, such as crushed stone, gravel and air-cooled slag of ½ to 3" size. Alternatively, if a fairly thick section, e.g., 2" to 1 foot or more is to be used without any finer surface coating, the aggregate may be composed of both coarse, ¼ to ¾", and fine aggregates and may include a dust filler, such as a mixture of 100 parts by weight of powdered limestone. The above aggregates may be graded either for density and lowest voids, or for a controlled desired amount of voids. Cinder-like aggregates may also be used in this invention. If desired, the fillers or aggregates may be subjected to severe attrition before or after mixture with the asphalt-urethane composition.

A typical paving mixture will ordinarily contain about 75% to 99.5% inoragnic aggregate bound together with about 0.5–25% of the asphalt-urethane binder composition. Preferably, the amount of urethane binder is about 4 to 20%. Hydrocarbon oils of the type generally used as rubber extender oils may be employed to cut the asphalt composition to workable viscosity when needed.

The following examples illustrate the effect of admixing uretane resins according to this invention with asphalt, and the improvements obtained therein.

EXAMPLE I

Polybutadiene No. 45 is a polybutadiene homopolymer having a viscosity of 50 poises at 30° C., a hydroxyl content of 0.95 meq./gm., a hydroxyl number (mg. KOH/gm.) of 53, and average molecular weight of 2200–2500, about 2.1 to 2.2 predominantly primary, terminal, allylic, hydroxyl groups, and an iodine number of 398. It can be prepared by polymerizing 100 parts of butadiene in the presence of 70 parts of isopropanol and 10 parts of hydrogen peroxide in an aluminum clad autoclave at 118° C. for 2 hours.

100 parts of this polybutadiene was mixed with 100 parts of petroleum asphalt vacuum still bottoms. This asphalt had a softening point of about 225° F., and was mixed with the diene polymer at 50° C. 7.7 parts tolylene diisocyanate and 0.2 part dibutyl tin dilaurate catalyst were then added. The ingredients were thoroughly mixed and cast into molds, which were allowed to cure at ambient temperature overnight. The specimens, after curing, showed good elastomeric properties and had higher tensile properties than gumstocks not containing asphalt. The compositions were useful as caulking compounds for concrete, glass, wood and various metal substrates. In particular, the low temperature properties of the asphalt were improved and the adhesion was improved.

EXAMPLE II

Styrene-butadiene copolymer No. 15 has a molecular weight of about 2200–2500, a viscosity at 30° C., of 250 poises, a hydroxyl content (meq./gm.) of 0.95, a hydroxyl number of 53 mg. KOH/gm., about 2.5 predominantly primary, terminal, allylic, hydroxyl groups, and an iodine number of 335. It can be made by polymerizing 75 parts butadiene and 25 parts styrene in the presence of 70 parts isopropanol and 10 parts of 50% hydrogen peroxide for 2½ hours at 120° C. Pontrar asphalt has a penetration of 20–60, a softening point (ASTM–D36) of 36° F. and a needle penetration at 77° F. of 40–60 (ASTM–D5).

100 grams of the styrene-butadiene copolymer No. 15, 9.2 grams of 3,3'-dichlorobenzidine and 100 grams of Pontrar asphalt were mixed at 50° C. and 15.4 grams TDI and 0.2 gram dibutyl tin dilaurate catalyst were added with good mixing. The mixture was poured into molds and permitted to cure at ambient temperature overnight. The resulting product was a tough elastomeric material, which was useful as a caulk, sealant, adhesive, etc.

EXAMPLE III

A low molecular weight hydroxyl-containing homopolymer of butadiene is prepared by polymerizing butadiene in isopropanol solvent in the ratio: 100 parts butadiene, 35 parts isopropanol and 6 parts of 50% aqueous hydrogen peroxide. The mixture is heated at 118–130° C. for about 2–3 hours to provide a liquid material showing a Brookfield viscosity of about 50 poises at 30° C. Analysis for hydroxyl-content of the polymer by infrared and acetyl chloride or acetic anhydride acetylation procedures showed the presence of about 0.90 meq. of OH/gm. and these are predominantly terminal and allylic. The molecular weight was about 2500 and the hydroxyl content per polymer molecule was estimated at about 2.25, average.

Ninety-three parts of this liquid polymer were mixed with 7 parts of tolylene diisocyanate (a commercial mixture of 80 parts tolylene 2,4-diisocyanate and 20 parts tolylene 2,6-diisocyanate) and the mixture was blended at about 60° C. into Pontrar asphalt at various concentrations of 20 to 80% asphalt and the physical properties of the final materials measured after casting into molds and curing at about 80° C. The unmodified asphalt showed no rubberlike properties and, therefore, could not be tested for tensile, elongation, etc. Properties of these asphalt-urethane blends are shown in Table I.

TABLE I.—MECHANICAL PROPERTIES OF ASPHALT-CAST URETHANE ELASTOMERS

| Sample No. | Asphalt parts per hundred parts urethane | Tensile strength, p.s.i. | Elong., percent at break | Tensile 100% | Modulus 200% | p.s.i. at 300% | Tear strength, p.s.i. | Hardness shore scale |
|---|---|---|---|---|---|---|---|---|
| 1621-96 | 25 | 190 | 408 | 193 | 137 | 166 | 31 | 36–39 |
| 1621-97 | 50 | 182 | 510 | 91 | 120 | 142 | 42 | 33–39 |
| 1621-98 | 100 | 196 | 869 | 69 | 85 | 98 | 34 | 25–36 |
| 1621-99 | 140 | 200 | 668 | 69 | 80 | 92 | 37 | 23–40 |
| 1621-100 | 200 | 180 | 1,159 | 59 | 61 | 66 | 32 | 18–43 |
| 1671-2 | 300 | 120 | 988 | 44 | 45 | 47 | 22 | 10–36 |
| 1671-3 | 400 | 149 | 972 | 43 | 44 | 49 | 24 | 10–44 |
| 1671-4 | *325 | 185 | 923 | 57 | 56 | 58 | 31 | 18–55 |

*Also contained 70 parts carbon black per hundred parts urethane.

It is noteworthy that with increasing amounts of asphalt elongation properties were improved. Shore hardness decreased with increasing amounts of asphalt showing that the hardness may be controlled to afford products of desired hardness level by varying the ratio of urethane to asphalt. Low temperature properties of all the aforementioned compositions were greatly improved by adding increasing amounts of the urethane compositions.

EXAMPLE IV

Preparation of a typical paving composition

A typical improved paving composition was prepared from a gravel aggregate having the following sieve analysis:

All passes ¾" sieve
Retain on ½" sieve and pass No. 10 sieve, 5% or below
Passes No. 4 sieve and retained on No. 10 sieve, 0–20%
Passes No. 10 sieve and retain on No. 40 sieve, 50–65%
Passes No. 40 sieve and retains on No. 200, 20–70%
Passes No. 200, less than 5%.

Ninety-four parts of this aggregate were preheated to 300–325° F. and admixed with 6 parts of urethane resin-asphalt mixture of the following composition:

| | Parts |
|---|---|
| Asphalt, 60–70 penetration ductility at 77° F. 70+ | 94 |
| Urethane resin described in Example III (chain extended in admixture with asphalt) | 6 |

The mixture of 94 parts aggregate and 6 parts of urethane-asphalt was blended at about 275° F. and packed into a paving test mold. After standing for 48 hours, the products were examined. A control sample of aggregate and asphalt (without urethane) was also made. The product containing the urethane had much less tack than the control sample and showed better flexibility at lower temperatures. Furthermore, the adhesion to the aggregate was much improved.

It is claimed:

1. A composition consisting essentially of asphalt having a penetration of up to about 400 at 77° F. and urethane made by reaction of a diisocyanate with an intermediate polyhydroxy polymer having an average of at least about 1.8 predominantly primary, terminal, allylic hydroxyl groups per molecule and being an addition polymer of 0–75% by weight of an alpha-olefinic monomer of 2 to 12 carbon atoms, and about 25 to 100% of a 1,3-diene hydrocarbon of 4 to about 12 carbon atoms, said intermediate polymer having a viscosity at 30° C. of about 5–20,000 poises, having the majority of its unsaturation in the main carbon chain, and a number average molecular weight of about 400 to 25,000, said urethane being at least partially uncured when combined with said asphalt, and said urethane and said asphalt each being present in amount of at least 1% of said composition.

2. The composition of claim 1 in which the intermediate polyhydroxy polymer has an average of 2.1 to 2.8 predominantly primary, terminal, allylic, hydroxyl groups per average polymer molecule.

3. The composition of claim 2 in which the diene is butadiene.

4. The composition of claim 2 having about 40 to 85 percent urethane resin.

5. The composition of claim 4 in which the diene is butadiene.

6. The composition of claim 1 where the entire urethane reaction takes place in the presence of said asphalt.

7. A road surfacing composition consisting essentially of about 75–99.5% of an inorganic aggregate and about 0.5 to 25% of the asphalt composition of claim 1 as a binder for the aggregate.

8. The composition of claim 7 in which the intermediate polyhydroxy polymer has an average of 2.1 to 2.8 predominantly primary, terminal, allylic, hydroxyl groups per average polymer molecule.

9. The composition of claim 8 in which the diene is butadiene.

10. The composition of claim 8 in which the binder has about 3 to 30% urethane resin.

11. The composition of claim 10 in which the diene is butadiene.

12. The composition of claim 7 where the entire urethane reaction takes place in the presence of said asphalt.

13. The composition of claim 1 having about 3 to 30% urethane resin.

14. The composition of claim 1 in which the asphalt has a penetration of about 20–300 at 77° F., the intermediate polyhydroxy polymer has a cis-1,4-unsaturation content of about 10–30 percent, a trans-1,4-unsaturation content of about 40–70 percent and a pendant 1,2-vinyl unsaturation of about 10–35 percent.

15. The composition of claim 1 in which the asphalt has a penetration of about 20–300 at 77° F., the diene is butadiene, the alpha-olefinic monomer is styrene and the intermediate polyhydroxy polymer has trans-1,4-unsaturation of about 50–65 percent, a cis-1,4-unsaturation of about 15–25 percent and a pendant 1,2-vinyl unsaturation of about 15–25 percent.

16. The composition of claim 1 in which the intermediate polyhydroxy polymer is obtained by addition polymerization of said alpha-olefinic monomer and said 1,3-diene hydrocarbon is a mixture of hydrogen peroxide and saturated alcohol of 2 to 12 carbon atoms.

17. The composition of claim 1 in which the diene is butadiene, the alpha-olefinic monomer is styrene, and the intermediate polyhydroxy polymer is obtained by addition polymerization of butadiene and styrene in a mixture of hydrogen peroxide and propanol or isopropanol.

18. The composition of claim 1 in which the intermediate polyhydroxy polymer is obtained by addition polymerization of butadiene in a mixture of hydrogen peroxide and propanol or isopropanol.

References Cited

UNITED STATES PATENTS

| | | | |
|---|---|---|---|
| 2,877,212 | 3/1959 | Seligman | 260—77.5 |
| 3,102,875 | 9/1963 | Heiss | 260—33.6 U |
| 3,175,997 | 3/1965 | Hsieh | 260—94.7 |
| 3,179,610 | 4/1965 | Wood | 260—28 |
| 3,338,861 | 8/1967 | Mastin et al. | 260—33.6 U |

FOREIGN PATENTS

| | | | |
|---|---|---|---|
| 855,911 | 11/1952 | Germany | 260—28 |
| 957,788 | 5/1964 | Great Britain | 260—2 |

OTHER REFERENCES

Product Bulletin Number 505, "Poly B–D Liquid Resins" Bulletin of Sinclair Petro Chemicals, Inc., May 1, 1965, pages 1, 2 and 4–10 cited.

MORRIS LIEBMAN, Primary Examiner

P. R. MICHL, Assistant Examiner

U.S. Cl. X.R.

260—28

UNITED STATES PATENT OFFICE
CERTIFICATE OF CORRECTION

Patent No. 3,637,558          Dated January 25, 1972

Inventor(s) Joseph A. Verdol and Patrick W. Ryan

It is certified that error appears in the above-identified patent and that said Letters Patent are hereby corrected as shown below:

Formula in Columns 5 and 6, at the end, the word --etc-- should appear.

Equations in Columns 9 and 10, the following title should designate the product of the first reaction:

--Polyolefin-Polyether-Urethane Rubber--;

and the following title should designate the product of the third reaction:

--Polyolefin-Polyester-Polyether-Urethane Rubber--.

Column 14, Line 10, "A" should read --An elastomeric--.

Column 14, Line 14, "1.8" should read --2.1--.

Column 14, Line 20, "the majority" should read --more than 50%--.

Signed and sealed this 19th day of September 1972.

(SEAL)
Attest:

EDWARD M. FLETCHER, JR.          ROBERT GOTTSCHALK
Attesting Officer          Commissioner of Patents